(12) United States Patent
Strickler

(10) Patent No.: US 12,088,677 B2
(45) Date of Patent: Sep. 10, 2024

(54) SYSTEMS AND METHODS FOR ASYNCHRONOUS AND SYNCHRONOUS NETWORK COMMUNICATION

(71) Applicant: Capital One Services, LLC, McLean, VA (US)

(72) Inventor: Brenton Strickler, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/820,122

(22) Filed: Aug. 16, 2022

(65) Prior Publication Data
US 2024/0064207 A1    Feb. 22, 2024

(51) Int. Cl.
*H04L 67/142*     (2022.01)
*H04L 47/24*      (2022.01)
*H04L 67/143*     (2022.01)

(52) U.S. Cl.
CPC ......... *H04L 67/142* (2013.01); *H04L 47/24* (2013.01); *H04L 67/143* (2013.01)

(58) Field of Classification Search
CPC ...... H04L 67/142; H04L 67/143; H04L 47/24
See application file for complete search history.

(56) References Cited

U.S. PATENT DOCUMENTS

| | | | |
|---|---|---|---|
| 6,336,135 B1* | 1/2002 | Niblett ............... | H04L 9/40 709/215 |
| 8,799,909 B1* | 8/2014 | Libby ............... | G06F 9/3004 718/101 |
| 2002/0091783 A1* | 7/2002 | Garland ............ | H04L 51/214 709/207 |
| 2003/0144849 A1* | 7/2003 | Kakivaya ......... | G06Q 30/0645 705/344 |
| 2003/0223431 A1* | 12/2003 | Chavez ............ | H04L 47/765 370/395.42 |
| 2004/0039786 A1* | 2/2004 | Horvitz ............ | H04L 67/54 709/207 |
| 2005/0149612 A1* | 7/2005 | Messinger ........ | G06F 9/5038 709/200 |
| 2006/0039401 A1* | 2/2006 | Shenfield ......... | H04L 67/56 370/462 |

OTHER PUBLICATIONS

Solace "Receiving Direct Messages", https://docs.solace.com/API/API-Developer-Guide/Receiving-Direct-Message.htm (Year: 2020).*

(Continued)

*Primary Examiner* — Glenton B Burgess
*Assistant Examiner* — Patrick F Ngankam
(74) *Attorney, Agent, or Firm* — Foley & Lardner LLP (57) ABSTRACT

In some aspects, a methods and systems may combine asynchronous and synchronous messaging infrastructure such that a single system can send messages both asynchronously and synchronously when needed. A system may implement an asynchronous system that is able to determine whether a message should be sent asynchronously or synchronously. If a message is to be sent synchronously, the asynchronous system may emulate a synchronous system by holding a network connection open and/or removing a default callback uniform resource locator (URL) from a data structure used in sending the message.

18 Claims, 4 Drawing Sheets

(56) References Cited

OTHER PUBLICATIONS

"Using Data Contracts," Microsoft Docs, Windows Communication Foundation, Sep. 15, 2021, https://docs.microsoft.com/en-us/dotnet/framework/wcf/feature-details/using-data-contracts (6 pages).
Paul Krzyzanowski, "Introduction to Sockets Programming," CS 417 Documents, Feb. 14, 2019, https://people.cs.rutgers.edu/~pxk/rutgers/notes/sockets (10 pages).
Priyank Gupta and Joel Shore, Synchronous vs. asynchronous communications: The differences, Aug. 18, 2021, https://www.techtarget.com/searchapparchitecture/tip/Synchronous-vs-asynchronous-communication-The-differences (7 pages).

* cited by examiner

SYSTEMS AND METHODS FOR ASYNCHRONOUS AND SYNCHRONOUS NETWORK COMMUNICATION

BACKGROUND

In synchronous communications, multiple computing devices continually listen for and act upon replies from each other. Both the sending device and the receiving device establish a communication session. Once the communication session is established, the two-way conversation may occur without restriction on which device sends or receives information and when. When a software component communicates synchronously, it may sit idle until it receives a call, response, value or other data transfer. As one device sends information across a network, the other device may be present and actively waiting to receive and respond to the information.

Conversely, in asynchronous communication, computing devices may avoid the need to actively listen for messages. Asynchronous communication may be non-blocking, and may allow code to continue to run after it has generated a call or response. Asynchronous communications typically incur a delay between when the sending device initiates the message and when the receiving device responds. During asynchronous communication, the receiving device may not expect to receive a reply in real time (e.g., within seconds, minutes, etc.).

SUMMARY

Synchronous systems and asynchronous systems each have potential benefits and drawbacks. Synchronous communication may be simpler in design but may carry the risk of spreading failures across services. For example, a synchronous stack for sending messages may be ten devices or components deep. If each device or component needs to maintain an open connection, there are many single points of failure that could cause the sending of the message to fail. Thus, a synchronous system may not be ideal for sending large numbers or batches of messages. However, because synchronous systems maintain a connection when communicating, one benefit is that a synchronous system can receive assurance that a message has been delivered more quickly than an asynchronous system.

On the other hand, asynchronous communication may trade architectural simplicity and data consistency for resilience and scalability. Asynchronous designs often provide better control over failures than synchronous setups. For example, an asynchronous system for sending messages may be more resilient because it is able to resend messages more efficiently when an initial attempt to send the messages fails (e.g., through the use of a message queue). Thus, asynchronous systems may be more suited to sending large batches of messages that are not urgent.

Due to the differing benefits and drawbacks of synchronous and asynchronous systems, organizations will typically implement each system and use each system to perform different tasks. For example, an organization may implement an asynchronous system to send batch messages to computing devices with the batch messages often being scheduled for sending far in advance. By sending the batch of messages asynchronously, a computing device may initiate the sending operation and then check on the batch later to make sure it was sent. However, an asynchronous system may not be ideal for sending an urgent message. For example, a cyber security intrusion detection system may need to ensure that an intrusion alert message is delivered as quickly as possible.

There are a number of drawbacks, however, with implementing separate asynchronous and synchronous messaging systems. One drawback is that it requires additional resources (e.g., computing resources to implement and operate multiple computing systems). For example, an organization may need to have two separate environments (e.g., one for asynchronous messages and one for synchronous messages) at all times to support the need to send messages asynchronously and synchronously. Additionally, having separate asynchronous and synchronous systems requires more developer time to maintain and debug.

To address these issues, methods and systems described herein combine asynchronous and synchronous messaging infrastructure such that a single system can send messages both asynchronously and synchronously when needed. Specifically, methods and systems described herein may implement an asynchronous system that is able to determine (e.g., based on priority information associated with a message) whether a message should be sent asynchronously or synchronously. If a message is to be sent synchronously, the asynchronous system may emulate a synchronous system by holding a network connection open and/or removing a default callback uniform resource locator (URL) from a data structure used in sending the message. Providing both asynchronous and synchronous functionality allows the system to reduce infrastructure resources and runtime environments needed to send messages because the asynchronous system and synchronous system are combined into one system.

In some aspects, a computing system may obtain a request to send a message. The request may include priority information indicating a priority level at which the message should be sent. The computing system may generate a data structure that includes the message. The data structure may be associated with an application programming interface (API) for sending messages. The computing system may determine, based on the priority information, whether the message should be sent synchronously or asynchronously. Based on determining that the message should be sent synchronously, the computing system may emulate a synchronous system by holding a network connection open. While holding the network connection open, the computing system may request, based on the data structure, that the message be sent via the API. While holding the network connection open, the computing system may also wait for a response indicating that the message was sent. Based on receiving a response indicating that the message was sent, the computing system may close the network connection.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
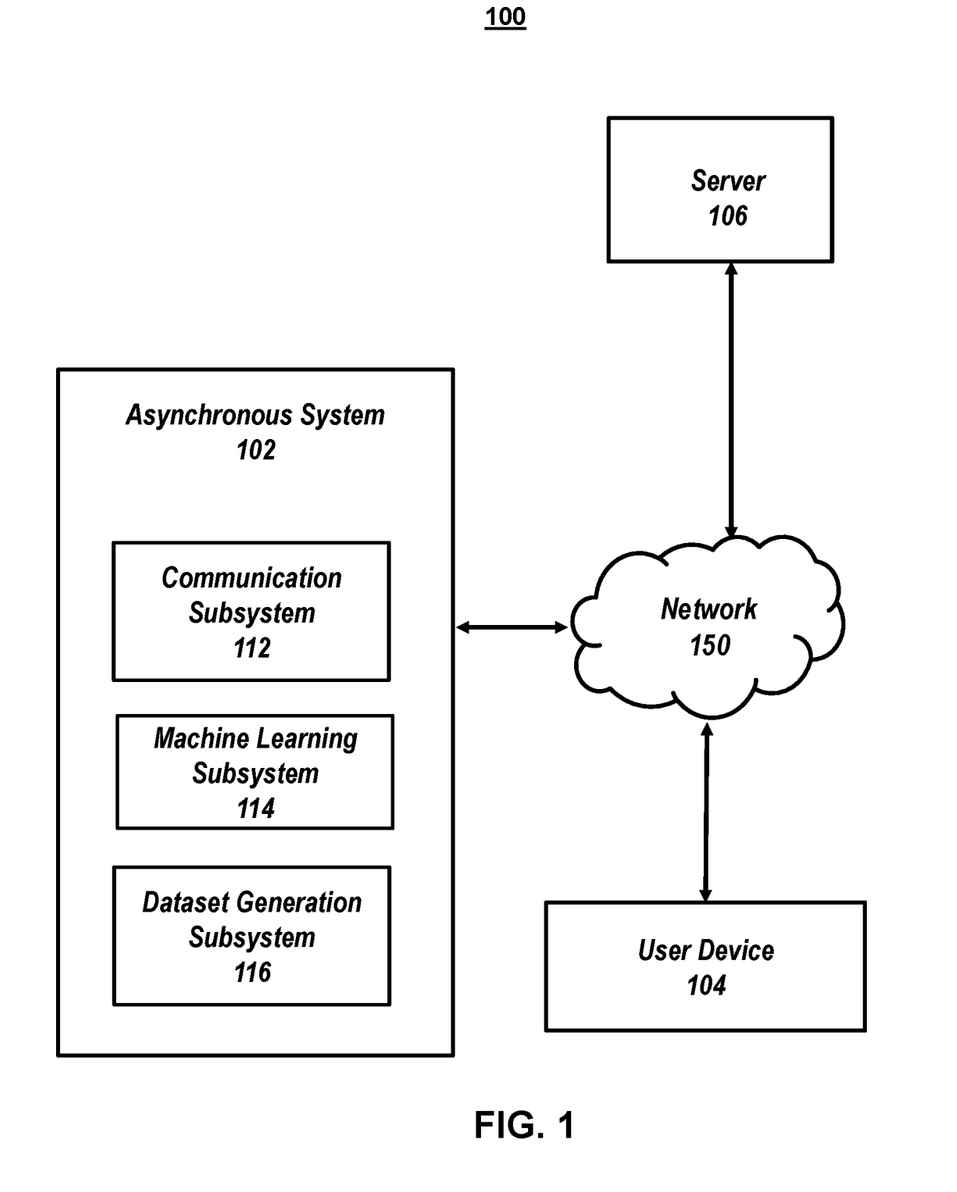
FIG. 1 shows an illustrative diagram for a system that can send messages both synchronously and asynchronously, in accordance with one or more embodiments.

FIG. 1 shows an illustrative diagram for a system that can send messages both synchronously and asynchronously, in accordance with one or more embodiments. For example, the system 100 may implement an asynchronous system that emulates a synchronous system when it is determined that a message should be sent synchronously. For example, the system 100 may include an asynchronous system 102, a server 106, a network 150, and a user device 104. The system 100 may determine (e.g., based on priority information associated with a message) whether a message should be sent asynchronously or synchronously. If a message is to be sent synchronously, the asynchronous system 102 may emulate a synchronous system by holding a network connection with the server 106 open and/or by removing a default callback URL from a data structure used in sending the message. The asynchronous system 102 may send the message to the server 106. While holding the network connection open, the asynchronous system 102 may receive a response from the server 106 indicating that the message was received. Providing both asynchronous and synchronous functionality allows the system to reduce infrastructure resources and runtime environments needed to send messages because the asynchronous system and synchronous system are combined into one system.

The asynchronous system 102 may obtain a request to send a message. As referred to herein, a message may include a variety of types of signals, data, or text. A message may include an email, text message, voice mail, or other audio or video recording. A message may include a heartbeat message, a message sent to coordinate multiple computing systems, a notification (e.g., a pull notification or a push notification), or a variety of other messages. The request to send a message may include priority information indicating a priority level at which the message should be sent. For example, the priority information may include a score (e.g., from 1 to 10) indicating how urgent the message is. The priority information may include a binary variable indicating whether the message should be sent asynchronously or synchronously.

The asynchronous system 102 may generate a data structure comprising the message. The data structure may be a map, a list, a JavaScript Object Notation (JSON) object or file, an extensible markup language (XML) file, or a variety of other objects, files, or data structures. The data structure may be a custom object that is associated with an API for sending messages. For example, the API may enable the sending of text messages (e.g., short message service (SMS)), email messages, notifications, or a variety of other messages. The data structure may include a variety of headers. For example, the headers may indicate a callback URL, a sender of the message, a recipient of the message, or a variety of other information.

The asynchronous system 102 may determine, based on the priority information, whether the message should be sent synchronously or asynchronously. As referred to herein, sending a message synchronously may block a process (e.g., that is being used to send the message) until the sending is complete or until a response is received (e.g., from another computing system). In some embodiments, sending a synchronous message may include both the send and receive operations completing when the message has been delivered to the receiver. In some embodiments, the sending of a synchronous message may complete when a send, receive, and reply message is received. The reply may include a return value that is returned to the asynchronous system 102. The return value may indicate, for example, that the message was successfully received. During the time that a synchronous message is being sent and received between two computing systems, the two computing systems may maintain a connection (e.g., an open or connected socket) with each other.

Sending a message asynchronously may be non-blocking. In some embodiments, sending a message asynchronously may only initiate the operation to send a message. After initiating the operation, the asynchronous system 102 may be able to perform additional operations, for example, while the message is in transit. Sending a message asynchronously may include adding the message to a buffer or a queue from which the message is eventually sent. In situations where a message is sent asynchronously, the asynchronous system 102 may avoid maintaining a connection with the receiving system while the message is sent or received.

In some embodiments, a different system may determine whether the message should be sent synchronously or asynchronously. For example, the asynchronous system 102 may send the message to an upstream system (e.g., a server or other computing device) that determines whether to send the message synchronously or asynchronously. The upstream system may be configured to send the message synchronously or asynchronously. In some embodiments, the asynchronous system 102 may direct the upstream system to send the message. For example, the asynchronous system 102 may send the message and a parameter to the upstream system. The parameter may indicate whether the message should be sent synchronously, asynchronously, or that there is no preference on whether the message is sent asynchronously or synchronously. The upstream system 102 may determine whether to send the message asynchronously or synchronously, for example, if the parameter indicates that there is no preference. The asynchronous system 102 may determine that there is no preference, for example, if the score (e.g., the priority score) is above a first threshold level (e.g., higher than 3 on a scale of 1 to 10) and below a second threshold level (e.g., less than 7 on a scale of 1 to 10). As an additional example, if the priority level is at a medium level (e.g., when possible priority levels are low, medium, and high), the asynchronous system 102 may determine that there is no preference and may allow the upstream system to determine whether to send the message synchronously or asynchronously.

The asynchronous system 102 may emulate a synchronous system. Emulating a synchronous system may include any action that a synchronous system may perform. For example, the asynchronous system may emulate a synchronous system by holding a network connection open. Additionally, or alternatively, the asynchronous system 102 may emulate a synchronous system by removing or deleting a callback URL associated with the message. For example, the callback URL may not be needed when a message is sent synchronously so the asynchronous system 102 may remove it or otherwise not include the callback URL in an API call or other operation associated with sending the message. As used herein, a callback URL may be any information that may be used to determine a location to send an indication that the message has been successfully sent. A callback URL may be the home destination after a script of executable code links two different functions or programs. The callback URL may identify the asynchronous system 102 or a different device or system.

The asynchronous system 102 may perform a variety of actions while holding the network connection open. For example, while holding the network connection open, the asynchronous system 102 may request, based on the data structure, that the message be sent via the API. As an additional example, while holding the network connection open, the asynchronous system 102 may wait for a response indicating that the message was sent. The asynchronous system 102 may close the network connection, for example, based on receiving a response indicating that the message was sent.

Figure 2:
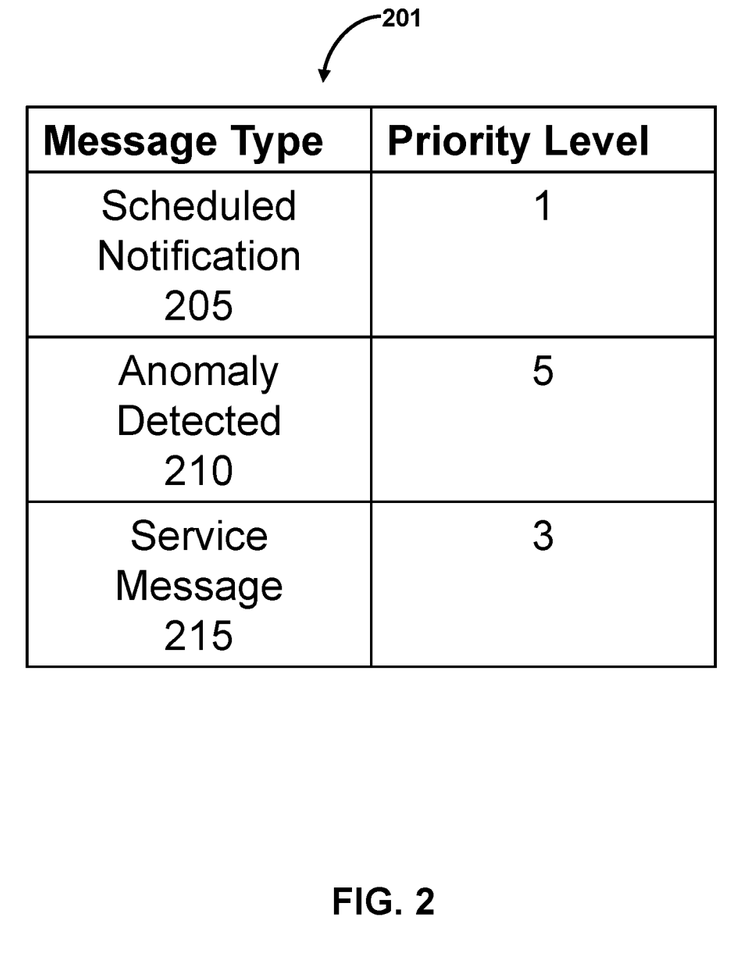
FIG. 2 shows example factors that may be used to determine whether a message should be sent synchronously or asynchronously, in accordance with one or more embodiments.

FIG. 2 shows example factors 201 that may be used to determine whether a message should be sent (e.g., by the asynchronous system 102) synchronously or asynchronously, in accordance with one or more embodiments. The asynchronous system 102 may determine to send a message synchronously or asynchronously based on a message type of a message and/or a priority level of the message. For example, a message type may include a scheduled notification 205 that has a priority level of 1. A scheduled notification may include a marketing message (e.g., that includes one or more offers, products, or other marketing information), an update to terms and conditions or other contracts, or a variety of other notifications. The asynchronous system 102 may determine to send a scheduled notification asynchronously, for example, because it has a priority level that is lower than a threshold priority level (e.g., a threshold level of 4).

A message type may include an anomaly detected type 210. An anomaly detected message type may include a message that indicates a detection of a fraudulent transaction (e.g., with a credit card, a debit card, a checking account, etc.), a detection of an intrusion by a cyber security intrusion detection system (e.g., a login that was not authorized by the account's owner), a detection that a large payment was made (e.g., larger than a threshold), or a variety of other anomalous activity. The asynchronous system 102 may determine to send a message synchronously if it is of the anomaly detected message type 210, for example, because it has a priority level of 5, which is higher than a threshold priority level (e.g., a threshold level of 4).

A service message 215 may include an update on an account balance (e.g., a bank account balance), a transaction summary, indicate that a software update is available (e.g., a software update that is not related to computer security), an indication that payment was received, or a variety of other messages. The asynchronous system 102 may determine to send a scheduled notification asynchronously, for example, because it has a priority level of 3, which is lower than a threshold priority level (e.g., a threshold level of 4).

Figure 3:
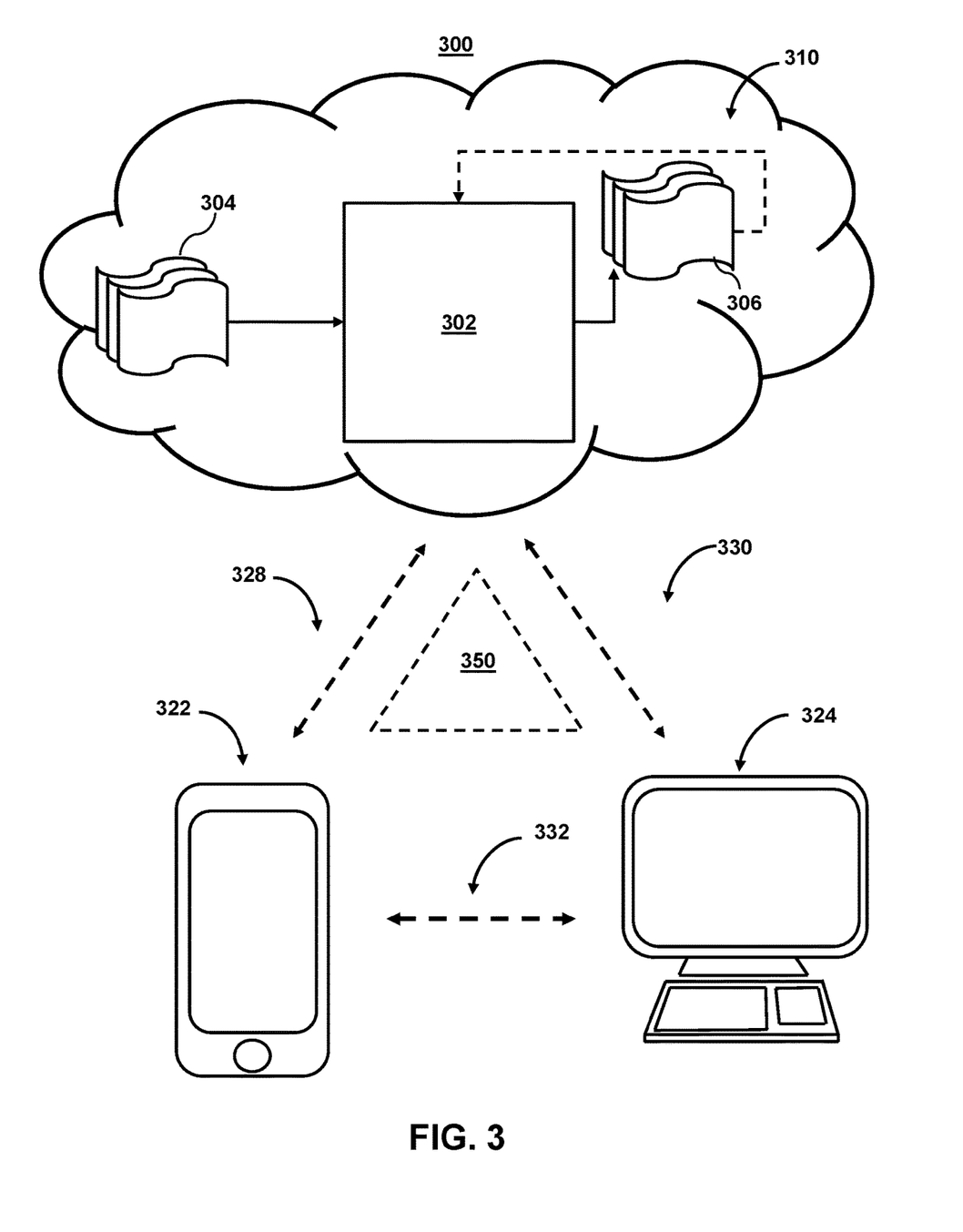
FIG. 3 shows illustrative components for a system used to send messages both synchronously and asynchronously, in accordance with one or more embodiments.

FIG. 3 shows illustrative components for a system used to send messages both synchronously and asynchronously, in accordance with one or more embodiments. For example, FIG. 3 may show illustrative components for using machine learning to determine a priority level of a message or whether the message should be sent synchronously or asynchronously. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or long-term evolution (LTE) network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include any device or component described above in connection with FIGS. 1-2. Cloud components 310 may include model 302, which may be a machine learning model, artificial intelligence model, etc. (which may be referred to collectively herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known class for the first labeled feature input. The system may then train the first machine learning model to classify the first labeled feature input with the known class (e.g., a priority level for a message).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., whether a message should be sent synchronously or asynchronously).

In some embodiments, the model (e.g., model 302) may automatically perform actions based on outputs 306. In some embodiments, the model (e.g., model 302) may not perform any actions. The output of the model (e.g., model 302) may be used to determine whether a message should be sent synchronously or asynchronously.

System 300 also includes API layer 350. API layer 350 may allow the system to generate summaries across different devices. In some embodiments, API layer 350 may be implemented on user device 322 or user terminal 324. Alternatively, or additionally, API layer 350 may reside on one or more of cloud components 310. API layer 350 (which may be a representational state transfer (REST) or web services API layer) may provide a decoupled interface to data and/or functionality of one or more applications. API layer 350 may provide a common, language-agnostic way of interacting with an application. Web services APIs offer a well-defined contract, called web services description language (WSDL), that describes the services in terms of its operations and the data types used to exchange information. REST APIs do not typically have this contract; instead, they are documented with client libraries for most common languages, including Ruby, Java, PHP, and JavaScript. Simple Object Access Protocol (SOAP) web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDoS protection, and API layer 350 may use RESTful APIs as standard for external integration.

Figure 4:
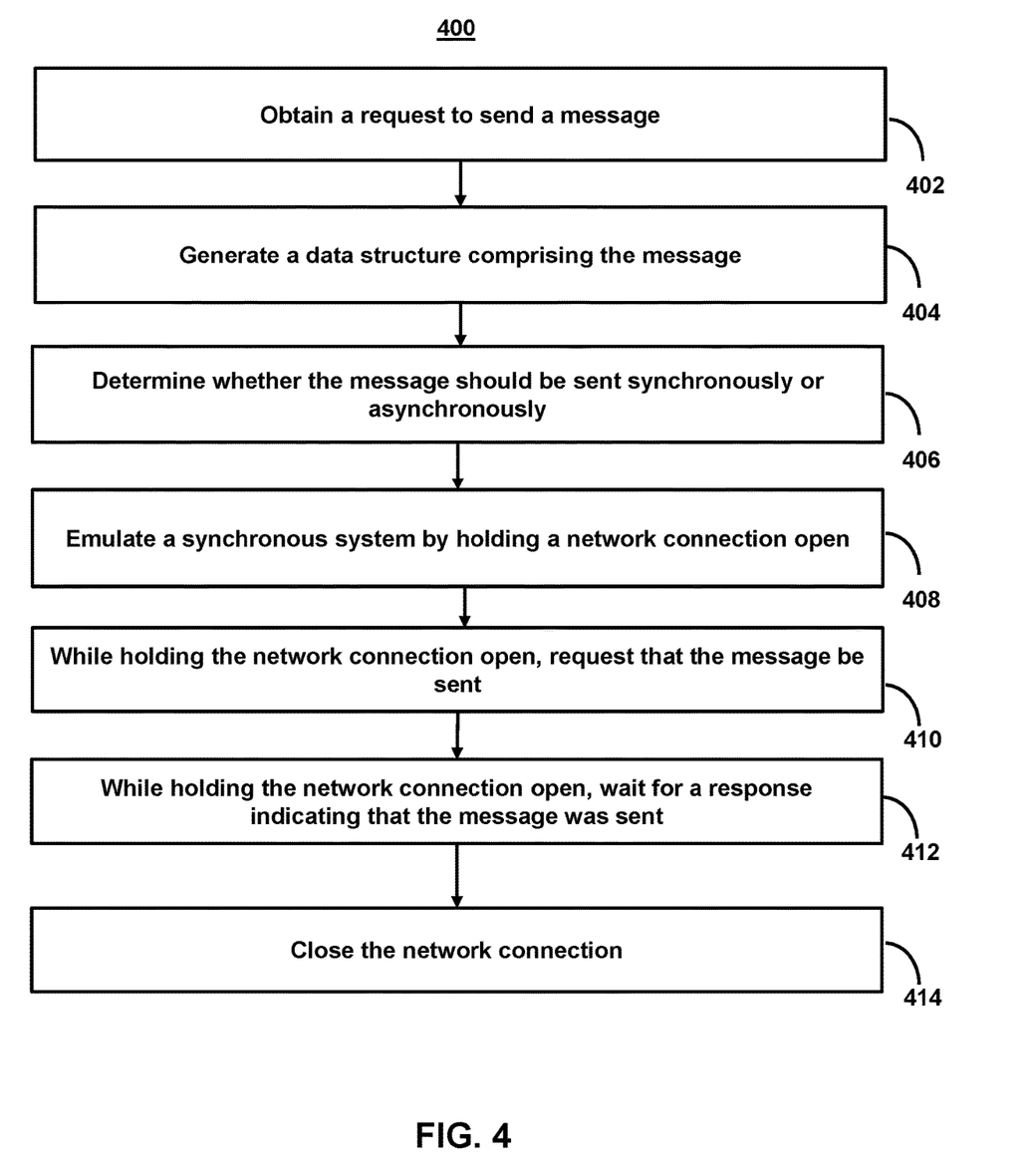
FIG. 4 shows a flowchart of the steps involved in emulating a synchronous system, in accordance with one or more embodiments.

FIG. 4 shows a flowchart of the steps involved in emulating a synchronous system, in accordance with one or more embodiments. For example, the system may use process 400 (e.g., as implemented on one or more system components described above) in order to combine synchronous system and asynchronous system functionality to reduce infrastructure resources and runtime environments needed to send messages. Although steps of process 400 may be described as being performed by the asynchronous system 102, one or more steps may be performed using a variety of devices or components, including the devices described above.

At step 402, the asynchronous system 102 may obtain a request to send a message. The request may include priority information indicating a priority level at which the message should be sent. For example, the message may include a notification that a suspicious transaction has occurred (e.g., a transaction that may be flagged as fraudulent) and the priority information may indicate that the message has a high priority (e.g., higher than a threshold priority).

In some embodiments, the priority information may indicate an endpoint associated with the message. For example, the priority information may indicate an email server or group of servers to which the message should be sent. There may be a plurality of endpoints that the message may be sent to and the asynchronous system may determine which endpoint to send the message to, for example, based on the priority information. The asynchronous system 102 may include a module that determines the correct endpoint. For example, the asynchronous system 102 may use the module to determine, based on mapping information associated with the endpoint, a variable to include in the data structure. The asynchronous system 102 may swap the variable with a default variable in the data structure. The variable may be used with the API to ensure that the message is sent to the correct endpoint.

At step 404, the asynchronous system 102 may generate a data structure comprising the message. The data structure may be associated with an API for sending a message. For example, the data structure may include one or more variables that are used by the API to send an email to the user device 104.

In some embodiments, the data structure may include a standard data contract. The standard data contract may indicate an endpoint (e.g., a server or other computing device) associated with the message and one or more primitive types associated with the endpoint. The data contract may enable the endpoint to understand the data sent by the asynchronous system 102. For example, the asynchronous system 102 may use different primitive types to represent information needed to send an email. The standard data contract may map the variables needed to send the email to one or more primitive types that are used by the endpoint.

At step 406, the asynchronous system 102 may determine whether the message should be sent synchronously or asynchronously. The asynchronous system 102 may determine based on the priority information, whether the message should be sent synchronously or asynchronously. For example, if the priority level is higher than a threshold level, the asynchronous system 102 may determine to send the message synchronously. If the priority level is less than the threshold level, the asynchronous system 102 may determine to send the message asynchronously.

In some embodiments, the asynchronous system 102 may determine whether to send the message synchronously or asynchronously based on whether the message includes callback information. For example, the asynchronous system 102 may determine that the message should be sent synchronously based on determining that the priority information does not include a callback URL. As an additional example, the asynchronous system 102 may determine that the message should be sent asynchronously based on determining that the priority information does include a callback URL.

In some embodiments, the asynchronous system 102 may determine to send a message asynchronously based on whether the message is part of a larger batch of messages. For example, the asynchronous system 102 may determine that the second message should be sent based on determining that the second message is part of a batch comprising a plurality of messages. Batches of messages may be sent out asynchronously, for example, because they are preplanned (e.g., marketing messages, monthly scheduled messages, etc.) or because they are not urgent (e.g., a priority level associated with the batch may be lower than a threshold priority level).

In some embodiments, the asynchronous system 102 may use machine learning to determine whether to send a message synchronously or asynchronously. A machine learning model may be used to determine whether the message is urgent, for example, based on who the message is from, who the message recipient is, the text of the message, or a variety of other factors. For example, the asynchronous system may generate, based on inputting the message into a machine learning model, output indicating an urgency score of the message. Based on the urgency score satisfying a threshold score, the asynchronous system 102 may determine that the message should be sent synchronously. The asynchronous system 102 may use any machine learning model described above (e.g., in connection with FIG. 3) to determine whether to send a message synchronously.

The asynchronous system 102 may use various factors to determine whether to send a message synchronously or asynchronously. In some embodiments, sending a message synchronously may be determined based on a user setting, industry standard, or other static element. Alternatively, or additionally, the asynchronous system 102 may determine to send a message synchronously based on one or more detected characteristics. For example, the system 102 may monitor the application from which the request was generated (e.g., an application executing on the user device 104). The system may then determine the threshold amount based on the application that requested the message be sent. By doing so, the asynchronous system 102 may enable messages to be sent and responses received more efficiently. For example, the asynchronous system 102 may decrease the amount of time needed to send a message (e.g., an urgent message) because it can send the message synchronously.

In another example, the system 102 may monitor the time of day/year (e.g., time of year). The system 102 may then determine whether to send a message synchronously based on the time of day/year. By doing so, the asynchronous system 102 may ensure that the message has an adequate amount of time to arrive at the intended destination. For example, during some portions of the year, there may be increased network traffic or increased sending of asynchronous messages. During these times, the asynchronous system 102 may determine to send a message synchronously, for example, if a priority level associated with the message satisfies a threshold (e.g., a threshold priority level).

In another example, the system 102 may monitor current network conditions. The system 102 may then determine the threshold amount based on the current network conditions. By doing so, the asynchronous system 102 may enable a message to reach its destination more quickly by sending the message asynchronously when the network has less traffic, when the network has greater bandwidth (e.g., greater than a threshold bandwidth), or when the network has lower latency (e.g., lower than a threshold latency).

In another example, the system 102 may monitor the streaming rate of the system 107. The streaming rate may be the average frequency in which the streaming system 107 sends messages asynchronously (e.g., average number of times per minute). The system may then determine to send a message synchronously, for example, based on the streaming rate. In another example, the system may monitor a buffer capacity (e.g., a buffer capacity of the asynchronous system 102). The system may then determine whether to send a message synchronously based on the buffer capacity. By doing so, the asynchronous system 102 may avoid adding a message to a batch of messages that is already full.

In some embodiments, the system may determine whether to send a message synchronously by weighting various characteristics. For example, the system may apply a weight to one or more of the characteristics above (e.g., the application using the streaming data, the source of the stream, the time of day/year, the current network conditions, the streaming rate, or the buffer capacity).

In some embodiments, the data structure may include a default callback URL. The asynchronous system 102 may remove the default callback URL from the data structure, for example, if the asynchronous system 102 determines to send the message synchronously. The default callback URL may be used for asynchronous messages and thus may be unnecessary when the asynchronous system 102 sends a message synchronously. By removing the default callback URL from the data structure, the asynchronous system 102 may reduce the amount of bandwidth needed to send the message or data structure because the data structure contains less information due to the removal of the callback URL. In some embodiments, removing the default callback URL may include removing a default callback URL from the data structure, which may comprise setting a variable that represents the default callback URL to a null value, and storing the variable in a header of the data structure.

At step 408, the asynchronous system 102 may emulate a synchronous system by holding a network connection open. The asynchronous system 102 may emulate a synchronous system, for example, based on determining that the message should be sent synchronously. Additionally or alternatively, the asynchronous system 102 may remove a default callback URL from the data structure. The callback URL may not be necessary for sending a message synchronously, and thus the asynchronous system 102 may remove it.

In some embodiments, the asynchronous system 102 may use a socket to hold the network connection open. For example, the asynchronous system may generate a socket for the network connection, set a variable of the socket that indicates the socket should operate in synchronous mode, and use the socket to communicate with a server. The asynchronous system 102 may hold the network connection open by delaying a command to close the socket or a command to close the network connection.

At step 410, the asynchronous system 102 may request that the message be sent, for example, while the asynchronous system 102 holds the network connection open. For example, the asynchronous system 102 may pass the data structure through a function call of the API. The API may cause the message to be sent, for example, to the user device 104.

At step 412, the asynchronous system 102 may, while holding the network connection open, wait for a response indicating that the message was sent. By holding the network connection open, the asynchronous system 102 may send the message synchronously and may receive a response that the message was sent more quickly than if the message were sent asynchronously. This may enable the asynchronous system 102 to verify that a message (e.g., a high priority message) was sent in a more efficient manner.

At step 414, the asynchronous system 102 may close the network connection. The asynchronous system may close the network connection, for example, based on receiving a response indicating that the message was sent.

In some embodiments, the asynchronous system 102 may receive additional requests to send messages. The messages may be sent asynchronously or synchronously by the asynchronous system 102. For example, the asynchronous system 102 may receive a second request to send a second message. The asynchronous system 102 may determine, based on second priority information associated with the second message, that the second message should be sent asynchronously. Based on determining that the second message should be sent asynchronously, the asynchronous system 102 may add the second message to a queue. The queue may be used to determine the order in which asynchronous messages should be sent.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:
1. A method comprising: obtaining a request to send a message, wherein the request comprises priority information indicating a priority level at which the message should be sent; generating a data structure comprising the message, wherein the data structure is associated with an API for sending messages; determining, based on the priority information, whether the message should be sent synchronously or asynchronously; based on determining that the message should be sent synchronously, emulating a synchronous system by holding a network connection open; requesting, based on the data structure, that the message be sent via the API; and waiting for a response indicating that the message was sent; and based on receiving a response indicating that the message was sent, closing the network connection.
2. The method of the preceding embodiment, wherein holding a network connection open comprises: generating a socket for the network connection; setting a variable of the socket, wherein the variable indicates the socket should operate in synchronous mode; and communicating, via the socket, with a server.
3. The method of any of the preceding embodiments, wherein the data structure comprises a standard data contract indicating an endpoint associated with the message and one or more primitive types associated with the endpoint.
4. The method of any of the preceding embodiments, wherein the priority information indicates an endpoint associated with the message, the method further comprising: determining, based on mapping information associated with the endpoint, a variable to include in the data structure; and swapping the variable with a default variable in the data structure.
5. The method of any of the preceding embodiments, wherein determining that the message should be sent synchronously comprises: determining that the priority level exceeds a threshold priority level associated with an endpoint indicated by the priority information; and based on determining that the priority level exceeds the threshold priority level, determining that the message should be sent synchronously.
6. The method of any of the preceding embodiments, wherein determining that the message should be sent synchronously is based on determining that the priority information does not include a callback URL.
7. The method of any of the preceding embodiments, further comprising: receiving a second request to send a second message; determining, based on second priority information associated with the second message, that the second message should be sent asynchronously; and based on determining that the second message should be sent asynchronously, adding the second message to a queue.
8. The method of any of the preceding embodiments, wherein determining that the second message should be sent asynchronously is further based on determining that the second message is part of a batch comprising a plurality of messages.
9. The method of any of the preceding embodiments, wherein determining that the message should be sent synchronously comprises: generating, based on inputting the message into a machine learning model, output indicating an urgency score of the message; and based on the urgency score satisfying a threshold score, determining that the message should be sent synchronously.
10. The method of any of the preceding embodiments, further comprising: based on determining that the message should be sent synchronously, removing a default callback uniform resource locator (URL) from the data structure.
11. The method of any of the preceding embodiments, wherein removing a default callback URL from the data structure comprises: setting a variable that represents the default callback URL to a null value; and storing the variable in a header of the data structure.
12. A tangible, non-transitory, machine-readable medium storing instructions that, when executed by a data processing apparatus, cause the data processing apparatus to perform operations comprising those of any of embodiments 1-11.
13. A system comprising one or more processors; and memory storing instructions that, when executed by the processors, cause the processors to effectuate operations comprising those of any of embodiments 1-11.
14. A system comprising means for performing any of embodiments 1-11.

What is claimed is:
1. An asynchronous system that emulates a synchronous system allowing the asynchronous system to send messages synchronously and asynchronously, the asynchronous system comprising:
one or more processors programmed with computer program instructions that, when executed by the one or more processors, cause operations comprising:
in response to obtaining a client request to send a message, generating a data structure comprising (i) the message and (ii) a callback variable identifying a call back uniform resource locator (URL);
determining that the message should be sent synchronously by:
generating, based on inputting the message into a machine learning model, output indicating an urgency score of the message; and
based on the urgency score satisfying a threshold score, determining that the message should be sent synchronously;
based on determining that the message should be sent synchronously, while holding a network connection open, causing the data structure with the callback variable to be sent via an application programming interface (API) call, wherein causing the data structure to be sent comprises modifying the data structure for the API call by removing the callback URL from the data structure such that the callback variable of the data structure (i) identifies the callback URL when the data structure was generated and (ii) no longer identifies the callback URL when sent via the API call;
waiting for a response indicating that the data structure was sent; and receiving a first response indicating that the message was sent, and closing the network connection based on the first response.

2. A computer-implemented method comprising:
obtaining a request to send a message, wherein the request comprises priority information indicating a priority level at which the message should be sent;
generating a data structure comprising (i) the message and (ii) a callback variable identifying a call back uniform resource locator (URL);
determining that the message should be sent synchronously by:
   generating, based on inputting the message into a machine learning model, output indicating an urgency score of the message; and
   based on the urgency score satisfying a threshold score, determining that the message should be sent synchronously;
based on determining that the message should be sent synchronously, while holding a network connection open, causing the data structure with the callback variable to be sent via an application programming interface (API) call, wherein causing the data structure to be sent comprises modifying the data structure for the API call by removing the callback URL from the data structure such that the callback variable of the data structure (i) identifies the callback URL when the data structure was generated and (ii) no longer identifies the callback URL when sent via the API call;
waiting for a response indicating that the data structure was sent; and
receiving a first response indicating that the message was sent, and closing the network connection based on the first response.

3. The method of claim 2, wherein holding the network connection open comprises:
generating a socket for the network connection;
setting a variable of the socket, wherein the variable indicates the socket should operate in synchronous mode; and
communicating, via the socket, with a server system.

4. The method of claim 2, wherein the data structure comprises a standard data contract indicating an endpoint associated with the message and one or more primitive types associated with the endpoint.

5. The method of claim 2, wherein the priority information indicates an endpoint associated with the message, the method further comprising:
determining, based on mapping information associated with the endpoint, a variable to include in the data structure; and
swapping the variable with a default variable in the data structure.

6. The method of claim 2, further comprising:
determining, based on current network traffic information associated with a network, a dynamic threshold priority level for an endpoint indicated by the priority information;
wherein determining that the data structure should be sent synchronously comprises:
   determining that the priority level exceeds the dynamic threshold priority level associated with the endpoint indicated by the priority information; and
   based on determining that the priority level exceeds the dynamic threshold priority level, determining that the data structure should be sent synchronously.

7. The method of claim 2, further comprising:
receiving a second request to send a second message;
determining, based on second priority information associated with the second message, that the second message should be sent asynchronously; and
based on determining that the second message should be sent asynchronously, adding the second message to a queue.

8. The method of claim 7, wherein determining that the second message should be sent asynchronously is further based on determining that the second message is part of a batch comprising a plurality of messages.

9. The method of claim 2, wherein causing the data structure with the callback variable to be sent via the API call comprises:
based on determining that the message should be sent synchronously, modifying the data structure for the API call by setting the callback variable to a null value that replaces the callback URL.

10. One or more non-transitory computer-readable media storing instructions that, when executed by one or more processors, cause operations comprising:
obtaining a request to send a message, wherein the request comprises priority information indicating a priority level at which the message should be sent;
generating a data structure comprising (i) the message and (ii) a callback variable identifying a call back uniform resource locator (URL);
determining that the message should be sent synchronously by:
   generating, based on inputting the message into a machine learning model, output indicating an urgency score of the message; and
   based on the urgency score satisfying a threshold score, determining that the message should be sent synchronously;
based on determining that the message should be sent synchronously, while holding a network connection open, causing the data structure with the callback variable to be sent via an application programming interface (API) call, wherein causing the data structure to be sent comprises modifying the data structure for the API call by removing the callback URL from the data structure such that the callback variable of the data structure (i) identifies the callback URL when the data structure was generated and (ii) no longer identifies the callback URL when sent via the API call;
waiting for a response indicating that the data structure was sent; and
receiving a first response indicating that the message was sent, and closing the network connection based on the first response.

11. The media of claim 10, wherein holding the network connection open comprises:
generating a socket for the network connection;
setting a variable of the socket, wherein the variable indicates the socket should operate in synchronous mode; and
communicating, via the socket, with a server.

12. The media of claim 10, wherein the data structure comprises a standard data contract indicating an endpoint associated with the message and one or more primitive types associated with the endpoint.

13. The media of claim 10, wherein the priority information indicates an endpoint associated with the message, the operations further comprising:

determining, based on mapping information associated with the endpoint, a variable to include in the data structure; and swapping the variable with a default variable in the data structure.

14. The media of claim 10, the operations further comprising:

determining, based on current network traffic information associated with a network, a dynamic threshold priority level for an endpoint indicated by the priority information;

wherein determining that the data structure should be sent synchronously comprises:

determining that the priority level exceeds the dynamic threshold priority level associated with the endpoint indicated by the priority information; and based on determining that the priority level exceeds the dynamic threshold priority level, determining that the data structure should be sent synchronously.

15. The media of claim 10, the operations further comprising:

receiving a second request to send a second message;

determining, based on second priority information associated with the second message, that the second message should be sent asynchronously; and based on determining that the second message should be sent asynchronously, adding the second message to a queue.

16. The media of claim 15, wherein determining that the second message should be sent asynchronously is further based on determining that the second message is part of a batch comprising a plurality of messages.

17. The media of claim 10, wherein causing the data structure with the callback variable to be sent via the API call comprises:

based on determining that the message should be sent synchronously, modifying the data structure for the API call by removing the callback URL from the data structure such that the callback variable of the data structure (i) identifies the callback URL when the data structure was generated and (ii) no longer identifies the callback URL when sent via the API call.

18. The media of claim 10, wherein causing the data structure with the callback variable to be sent via the API call comprises:

based on determining that the message should be sent synchronously, modifying the data structure for the API call by setting the callback variable to a null value that replaces the callback URL.

* * * * *